F. L. MORSE.
DRIVE CHAIN.
APPLICATION FILED SEPT. 22, 1905.

1,027,352.

Patented May 21, 1912.

Witnesses:

Frank L. Morse, Inventor
By his Attorney

BEST AVAILABLE COPY

UNITED STATES PATENT OFFICE.

FRANK L. MORSE, OF TRUMANSBURG, NEW YORK, ASSIGNOR TO MORSE CHAIN COMPANY, OF TRUMANSBURG, NEW YORK, A CORPORATION OF NEW YORK.

DRIVE-CHAIN.

1,027,352.

Specification of Letters Patent.   Patented May 21, 1912.

Application filed September 22, 1905. Serial No. 279,631.

*To all whom it may concern:*

Be it known that I, FRANK L. MORSE, a citizen of the United States, residing in Trumansburg, county of Tompkins, State of New York, have invented or discovered a certain new and useful Improvement in Drive-Chains, of which improvement the following is a specification.

This invention relates to drive chains for sprocket wheels and more particularly to that type of chain wherein the links are composed of two side bars or plates joined by pintles at their ends. In chains of this type a roller has heretofore been mounted on each pintle of the chain for engaging the sprocket teeth and diminishing friction, but these rollers have been found objectionable for the reason that they become loose after a little wear and also become clogged with dust and dirt when used in exposed places.

One of the objects of my invention is to overcome this difficulty and to increase the strength and durability of the chain by providing the adjacent ends of the plates of the link with laterally thickened portions adapted to meet together and having surfaces for engaging the sprocket teeth.

Another feature of my invention relates to improved means for securing a part of the pintle in its position in the plates, and comprises additional rivet pieces of soft metal which may be readily upset or headed over to hold the parts in position or cut away when it is desired to remove the hardened part of the pintle.

Another important feature of my invention consists in providing soft metal rivet pieces for riveting the links of the chain together, which obviates the necessity for riveting the ends of the hardened part of the pintle for that purpose.

Figure 1:
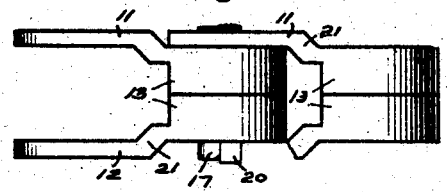
Figure 3:
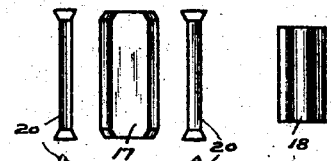
Figure 2:
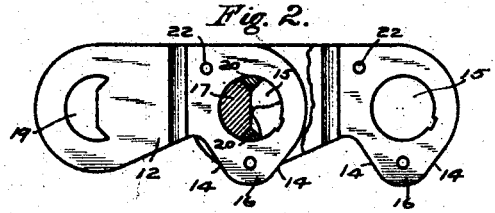
Figure 4:
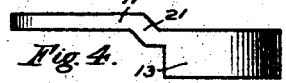
Figure 5:
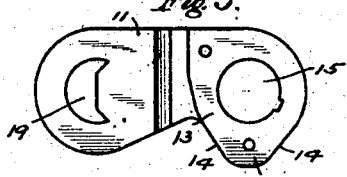
Figure 6:
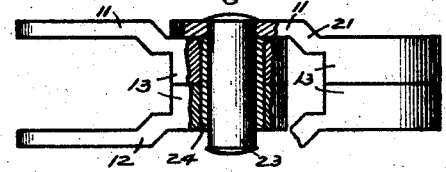
Figure 8:
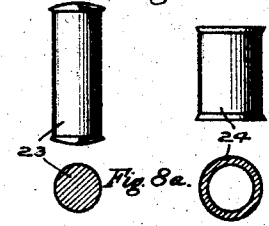
Figure 7:
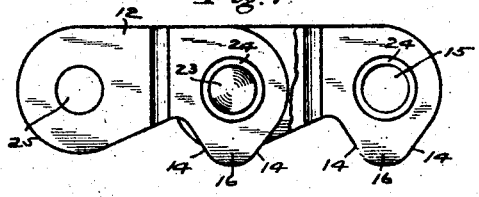
Figure 9:
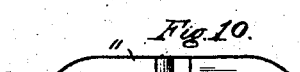
Figure 10:
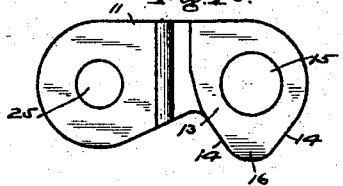

In the accompanying drawing, Figure 1 is a plan view of two links of a chain, constructed according to my invention, a part of one of the side plates of one link being broken away; Fig. 2 a side elevation of the same with a part of the pintle indicated in section; Fig. 3 and Fig. 3ᵃ a plan and end view respectively showing the parts of the pintle separated; Fig. 4 and Fig. 5 a plan and inside elevation of one of the plates of a link; Fig. 6 a plan view of two links with a modified form of pintle shown in horizontal section; Fig. 7 a side elevation of the links shown in Fig. 6; Fig. 8 and Fig. 8ᵃ, a plan and sectional view respectively showing the parts of the modified form of pintle separated; and Fig. 9 and Fig. 10 a plan and inside elevation of one plate of the form of link shown in Fig. 6.

According to the construction shown the link is composed of two side plates 11 and 12, each being provided at one end with a laterally thickened portion 13 extending inwardly toward and meeting against the other, the thickened end portions also extending downward at 16 and having surfaces 14 for engaging the teeth of the sprocket wheel. An opening 15 which is preferably of circular form is made through the thickened end portions of the plates for the pintle. The thickened end portions are preferably formed as an integral part of the plate in order to increase the tensile strength and durability of the link.

As shown in Figs. 1 to 5 the pintle is of the two part type comprising a seat pin 17 and a rocker 18 adapted to turn or rock one upon the other as the chain passes on and off from the sprocket wheel. The seat pin is preferably arranged to pass loosely through the opening 15 in the thickened ends 13 of the plates and be rigidly secured in the thin ends of the plate of the adjacent link which may have substantially crescent-shaped openings 19 for this purpose, while the rocker pin is mounted in the opening 15 between the seat pin and the thickened ends of the plates. The parts of the pintle which turn upon each other are usually made of hardened steel, and for fastening the same in the plates I provide small strips or rivet pieces 20 of softer metal which may be inserted through the opening in the plate beside the hardened pin and then headed over on the end thereby securing the pin in position and holding the links of the chain together. With this construction, when it is desired to remove or replace the pintle, the headed-over portion of the soft metal may be readily cut away with a tool and the parts of the pintle easily driven out, thereby greatly facilitating the replacing of parts. These wedge strips may be made in any desired shape but I prefer to form the seat pins with beveled corners and ends so that the wedge strips 20 may extend through the two plates the full length of the seat pin and be headed over at both ends as this holds the pin firmly in place.

The side plates are preferably offset, as at 21, so as to make all links alike and bring the outside ends thereof into the same plane, and the thickened ends of the two plates of each link may be fastened together by rivets 22.

As shown in Figs. 6 to 10 the chain is formed with a modified pintle comprising a cylindrical pin 23 and a bushing 24 the latter extending through the thickened ends of the two plates while the pin passes through the bushing and the cylindrical openings 25 in the thin ends of the two plates of the adjacent link. The bushing may be flared sufficiently at its ends to hold the thickened ends of the plates securely together.

It will now be apparent that by means of my improvement a very strong and durable form of chain is provided, the links having a solid end or head with properly formed surfaces for engaging the sprocket teeth, and with no loose parts to become clogged with dirt and dust.

It will be noted that the bearing surfaces 14 are arranged on both the inside and outside of the solid end portion of the link for engaging the teeth of the driving sprocket wheel on one side and the teeth of the driven sprocket wheel upon the other side, whereby only one end of the link plates makes engagement with the sprockets.

Having now described my invention, what I claim as new and desire to secure by Letters Patent is:—

1. A drive chain having a pintle and links formed of two side plates provided with laterally thickened end portions surrounding the pintle and having downward extensions engaging the sprocket teeth.

2. A drive chain having links formed of two laterally bent side plates, said plates having thick ends meeting together and provided with downward extensions having surfaces for engaging the sprocket teeth, and a pintle passing through said thick ends of the plates.

3. A drive chain having links composed of two side plates each provided with a laterally thickened end and having a downward extension for engaging the sprocket teeth, and pintles formed in separate parts adapted to turn one upon another, one part being carried by the thin ends and the other by the thickened ends of said plates.

4. A drive chain having links composed of two side plates each provided with a laterally thickened end and having a downward extension for engaging the sprocket teeth, and two-part pintles comprising seat pin and rocker adapted to turn one upon the other, the seat pin being supported by the thin ends of the plates and the rocker being carried by the thick ends.

5. A drive chain consisting of links provided with downward extensions and hardened steel pintles and rivet pieces of soft metal for fastening the pintles in place in the links.

6. A drive chain having links composed of a plurality of plates and pintles formed in separate parts adapted to turn one upon another, and rivet pieces of softer metal than the pintles for holding one of the parts thereof in position in the plates.

7. A drive chain having links composed of two side plates, pintles formed in separate parts adapted to turn one upon another, and rivet pieces of softer metal than the pintle for fastening the ends of one of said parts in the two side plates.

8. A drive chain having links composed of two side plates with pintle openings in their ends, pintles formed in separate parts adapted to turn one upon another, one part extending through the openings in said plates, and wedge strips of softer metal than the pintle also extending through said openings and adapted to be headed over to fasten the part of the pintle in said plates.

9. A drive chain having links composed of two side plates provided with downward extensions for engaging the sprocket teeth, hardened steel pintles for said links, and soft metal rivets for securing the links of the chain together and the pintle in place in said links.

10. A drive chain having links composed of side plates meeting together at one end, and provided with downward extensions at said end for engaging the sprocket teeth, and pintles for joining said links.

In testimony whereof I have hereunto set my hand.

FRANK L. MORSE.

Witnesses:
HOWARD W. RILEY,
ALFRED B. WRAY.